United States Patent
Tadman et al.

(10) Patent No.: US 6,774,921 B1
(45) Date of Patent: Aug. 10, 2004

(54) METHOD AND APPARATUS FOR DYNAMICALLY SAVING/RESTORING THE PROPERTIES OF CONTROLS IN A SCREEN DIALOG

(75) Inventors: Mark Jeffrey Tadman, Mission Viejo, CA (US); Randy Alan Steuckrath, Laguna Niguel, CA (US); John Earl Pittaway, Santa Ana, CA (US)

(73) Assignee: Unisys Corporation, Blue Bell, PA (US)

( * ) Notice: Subject to any disclaimer, the term of this patent is extended or adjusted under 35 U.S.C. 154(b) by 593 days.

(21) Appl. No.: 09/715,779

(22) Filed: Nov. 17, 2000

(51) Int. Cl.[7] .............................................. G09G 5/00
(52) U.S. Cl. ..................... 345/764; 345/762; 707/104.1
(58) Field of Search ................... 345/762, 763, 345/764, 765, 809, 965, 966, 967; 707/100, 102, 104.1; 714/2, 15, 16, 18, 19

(56) References Cited

U.S. PATENT DOCUMENTS

| | | | | | |
|---|---|---|---|---|---|
| 5,771,032 A | * | 6/1998 | Cline et al. | ................. | 345/786 |
| 5,872,974 A | * | 2/1999 | Mezick | ....................... | 717/109 |
| 5,983,001 A | * | 11/1999 | Boughner et al. | ............ | 714/38 |
| 6,260,044 B1 | * | 7/2001 | Nagral et al. | ................ | 707/102 |
| 6,295,611 B1 | * | 9/2001 | Connor et al. | ................ | 714/20 |
| 6,429,882 B1 | * | 8/2002 | Abdelnur et al. | ........... | 345/763 |

* cited by examiner

Primary Examiner—John Cabeca
Assistant Examiner—Brian Detwiler
(74) Attorney, Agent, or Firm—Nathan Cass; Mark T. Starr; Lise A. Rode (57) ABSTRACT

A system and method for dynamically saving the properties of transient controls in a general screen dialog and enabling these properties to be restored at a later time. In a typical GUI based computer program, a number of user interface objects or "controls" are presented graphically to a user on a form to allow the user to input information by interfacing these controls. The activation of the various controls on the form by a user is referred to as the screen dialog. The present invention allows a user of the computer system to save the current properties of a form's transient controls to a database, where this form can later be restored with its transient controls having the same properties as when the form was saved. A screen dialog save procedure loops through all of the controls on a form and inserts a record of each control type along with its respective property values into a database. A user may browse through saved screen dialogs in the database and select a desired screen dialog to restore. A screen dialog restore procedure loops through all of the controls saved in the database for the selected screen dialog, where a record of the control information for each control is obtained and the property values for each respective control is set on the restored form. The present invention allows the properties of objects in a screen dialog to be saved and restored without the need for scripting.

24 Claims, 10 Drawing Sheets

METHOD AND APPARATUS FOR DYNAMICALLY SAVING/RESTORING THE PROPERTIES OF CONTROLS IN A SCREEN DIALOG

Copyright Mask Work
37 CFR 1.71 (d)(e)

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The subject invention relates generally to a method of saving and retrieving information in a computer network environment and more particularly to a method and apparatus for saving and restoring the properties of controls in a general screen dialog.

BACKGROUND OF THE INVENTION AND RELATED ART

A graphical user interface (GUI) is a type of display that enables a user to choose commands, start programs, and see lists of files and other options by pointing to pictorial representations (icons) and lists of menu items on a screen. The GUI presentation configures a screen to provide a graphical display for a user to enter or view information. Specifically, an application program executing on the computer system presents the information to the user through a window by drawing images, graphics, or text within the window region. The user, in turn, communicates with the application by interfacing with objects in the window region with a cursor that is typically controlled by a user-operated input device, such as by pointing and clicking the object using a mouse.

One of the distinct advantages of a GUI is a standardized graphical presentation of information and user interface objects or "controls." Such controls include sizable windows, menus, pushbuttons, scroll bars, checkboxes and the like. User input is received by a GUI program via menus, pushbuttons, list boxes, edit boxes, mouse "clicks" alone or coupled with keystrokes, keyboard commands and other techniques well known to those skilled in the art. Programs developed for GUIs have a more consistent appearance, and menu structures have advanced to the point where most software developers adhere to a fairly standard format for common menu command items such as FILE, EDIT, FORMAT, WINDOW, HELP, etc., thereby enabling the user to become more rapidly proficient in using a new GUI based program.

The visual representation of a GUI window that is displayed when a program is executed is referred to as a "form." Forms can be created in a number of ways known to those skilled in the art, where an easy and commonly used programming development system is Visual Basic® (hereinafter VB) from Microsoft Corporation. In designing a form for a GUI program, VB allows a programmer to simply use a click-drag mouse operation to insert a visual object on a form. User interface visual objects are referred to as "controls" in the VB programming environment. Each form typically contains a plurality of controls controllable by a user. Based upon user activation of the controls as well as user input, the state of the controls will provide a variety of information about the user's responses. The collective activation of the controls on a form and the responses to the controls is known as the screen dialog.

The state of the controls on a form may be as simple as a few selections on a single dialog which have been "clicked" or may be as complex as a navigation through, many dialogs. There is often a need for saving the current state of the transient controls on the screen dialog so that the screen dialog can be easily reconstructed. Most existing solutions for saving the state of the controls of a screen dialog create a script to replay when the user wishes to restore the screen dialog. With this approach, after the form has been saved, the user then locates the form through conventional utilities, translates the form into a script, parses the script using an interpreter, and rebuilds the form. This method of saving and rebuilding a form unfortunately requires scripts to be designed for each particular application. Thus, while the approach does allow a screen dialog to be restored, it is, in effect, an interpreter, requiring the use of an existing interpretive engine and language or implementation of a new one.

In addition to simplifying the manner in which the current state of a screen dialog can be saved and restored, it is desirable to provide a method of saving and restoring the properties of controls in a screen dialog without requiring the use of a known script and interpreter.

SUMMARY OF THE INVENTION

A system and method for dynamically saving the properties of transient controls in a general screen dialog and enabling these properties to be restored at a later time. In a typical GUI based computer program, a number of user interface objects or "controls" are presented graphically to a user on a form to allow the user to input information by interfacing these controls. The activation of the various controls on the form by a user is referred to as the screen dialog. The present invention allows a user of the computer system to save the current state of a form's transient controls to a database, where this form can later be restored with its transient controls being in the same state as when the form was saved. A screen dialog save procedure loops through all of the controls on a form and inserts a record of each control type along with its respective property values into a database. A user may browse through saved screen dialogs in the database and select a desired screen dialog to restore. A screen dialog restore procedure loops through all of the controls saved in the database for the selected screen dialog, where a record of the control information for each control is obtained and the property values for each respective control is set on the restored form. The present invention allows the properties of controls within screen dialogs to be saved and restored without the need for scripting.

BRIEF DESCRIPTION OF THE DRAWINGS

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

DETAILED DESCRIPTION OF ONE EMBODIMENT

The present invention comprises a novel process for storing and restoring the properties of transient controls on a screen dialog and an associated computer program based mechanism for control of a computer system. The following description is presented to enable any person skilled in the art to make and use the invention. Descriptions of specific applications are provided only as examples. Various modifications to the preferred embodiment will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
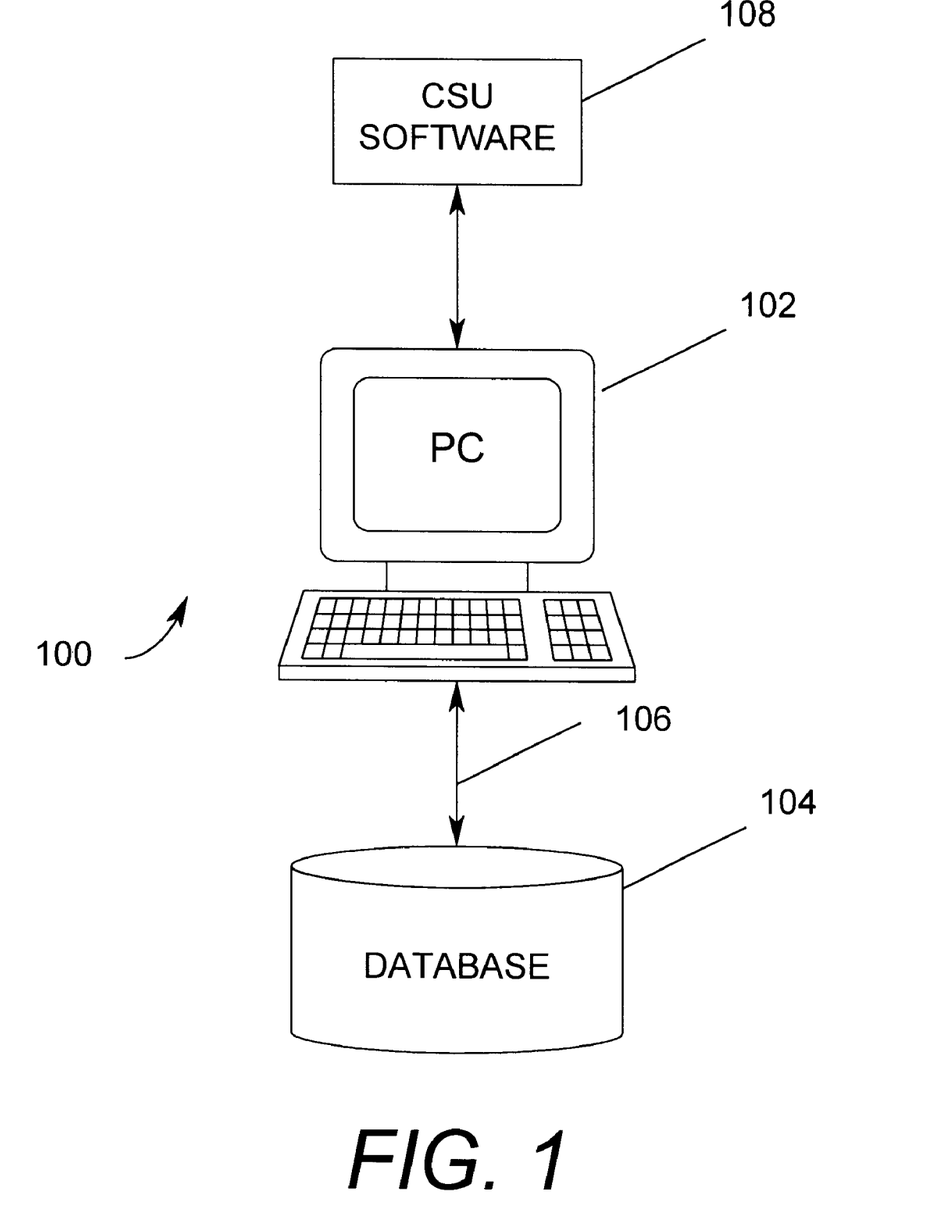
FIG. 1 is a diagram of a computer system in which the present invention may be implemented.

The illustrative drawing of FIG. 1 shows an exemplary computer system 100 in which the present invention can be implemented. The computer system 100 includes a personal computer 102 and a database 104. The personal computer 102 includes typical computer components, such as a processor unit, a display device, user interface devices (such as a keyboard and a mouse), RAM, a hard drive, etc. A data path 106 connects the personal computer 102 to the database 104. The database 104 may be located remotely from the personal computer 102 or, alternatively, may be located on a portion of the hard drive within the personal computer 102 itself. The illustration of FIG. 1 is only one example of the many computer systems available and is only illustrated to show a simple and basic configuration for the present invention. It is understood to those skilled in the art that replacements, modification, and alterations of this computer system 100 are possible. For example, any type of data path 106 can be established between the personal computer 102 and the database 104, including but not limited to an electrical connection, optical connection, RF transmission, cellular connection, and the like. Further, a network of processors, a client/server relationship, or a mainframe computer can be used for processing activity instead of a single processor unit. The present invention may be implemented with all variations of such computer system.

The present invention is directed to an improved process for saving the properties of transient controls in a general screen dialog and enabling these properties to be restored at a later time. In a typical GUI based computer program, a number of user interface objects or "controls" are presented graphically to a user on a form to allow the user to input information by interfacing with these controls. The activation of the various controls on the form by a user is referred to as the screen dialog. The present invention allows a user of the computer system to save the current properties of a form's transient controls to a database, where this form can later be restored with its transient controls having the same properties as when the form was saved.

With further reference to FIG. 1, the preferred embodiment of the present invention provides a computer program based mechanism 108 for controlling a computer system 100 to save the current properties of a form's transient controls in a database 104. The mechanism 108 shall be referred to herein as the Command Store Utility software (CSU). The CSU is implemented by a computer software module created in a storage medium, such as RAM, ROM, or a disk, of the computer system 100. The CSU is registered on the personal computer which is executing the CSU caller's application. The CSU is preferably a stand-alone Visual Basic ActiveX control (OCX) that can be utilized within any software programming language capable of communicating with Active X components, such as Microsoft Windows® (e.g., NT, Win2000, Win95, Win98, WinME) or other ActiveX compatible computer software programming languages (e.g., Microsoft Visual C++). Those skilled in the art will appreciate that other types of stand-alone ActiveX components can be utilized for the CSU.

When a user desires to save or restore the properties of the transient controls of a screen dialog, the user initiates a request to the computer system 100 and the CSU acts as an engine to save and/or restore the function requests as commanded by the user. The following description will be initially directed to the process by which the CSU program saves the properties of controls in a screen dialog and then move on to the process by which the properties of a saved properties for these controls in the screen dialog are restored.

Figure 2A:
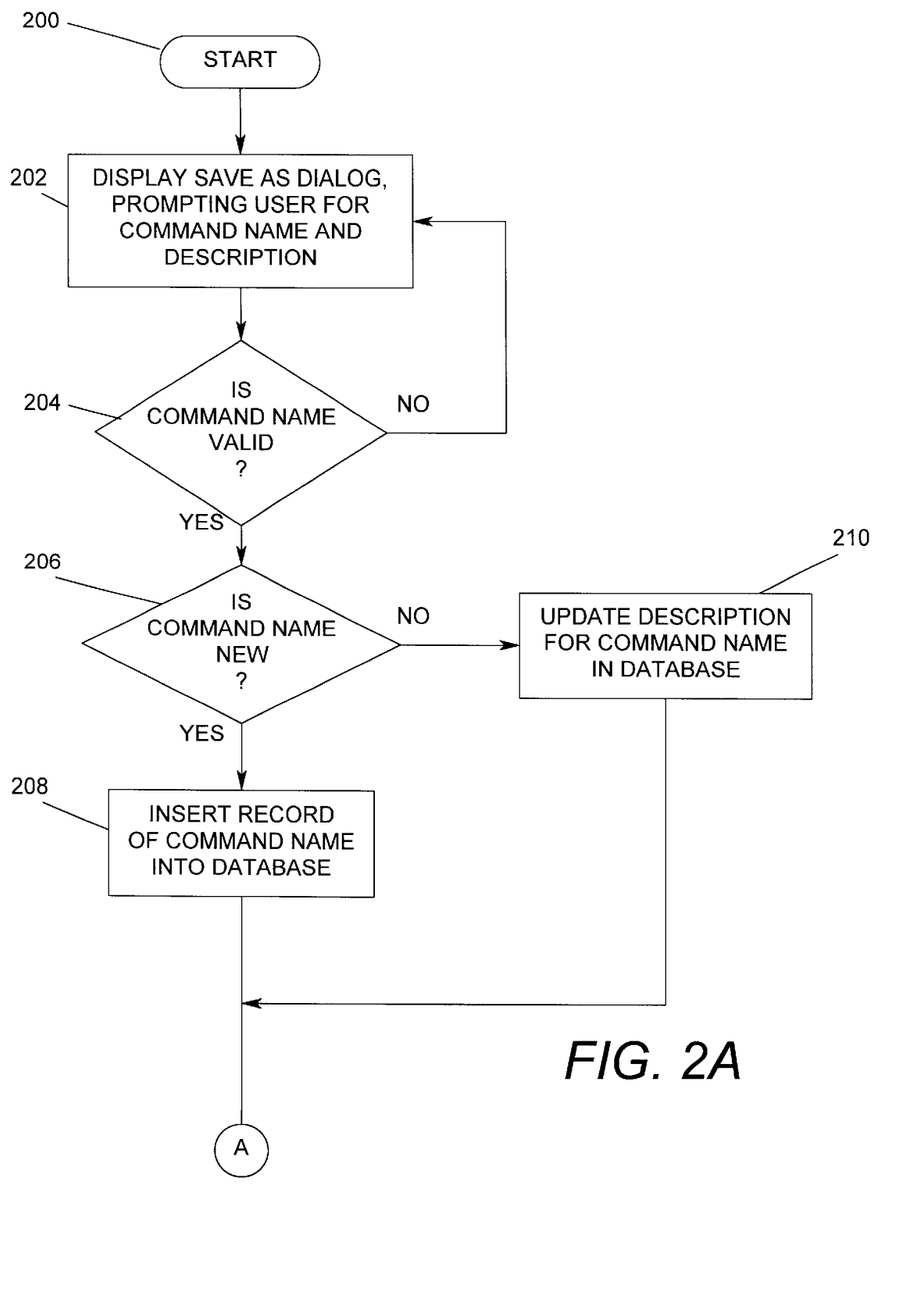
FIG. 2A is a flow diagram illustrating operation of a database verification procedure in accordance with a preferred embodiment of the present invention.

When a user initiates a request to save the properties of the controls in a current screen dialog, the CSU program is called upon and initially performs a database verification procedure, as illustrated in a block diagram flowchart in FIG. 2A. Database verification begins at step 200 when a user initiates the screen dialog saving program of the present invention. Upon initiation of a save loop of the CSU program, the user is provided with the CSU Save Command Dialog and is prompted with a "Save As" dialog display in step 202, prompting the user to enter a command name and description. The command name provides an identifier for the screen dialog to be saved in the database 104, and the user may optionally also include descriptive text to be saved with the command name. In step 204, the database verification procedure determines whether the command name entered by the user is valid (e.g., the command name entered is not blank and does not contain invalid characters). If the command name is determined to be invalid, control returns to step 202 where the user is again prompted to enter a command name. Once a valid command name has been entered by the user, the CSU program determines in step 206 whether the command name is new or if it already exists in the database 104. If the command name is new, control moves on to step 208 where a record of the entered command name is inserted into the database 104. If the command name is determined to already exist in the database 104, the description for the command name is then updated in the database in step 210. After the command names have been inserted or updated in the database 104, the CSU then proceeds to begin storing the properties of the form.

Figure 2B:
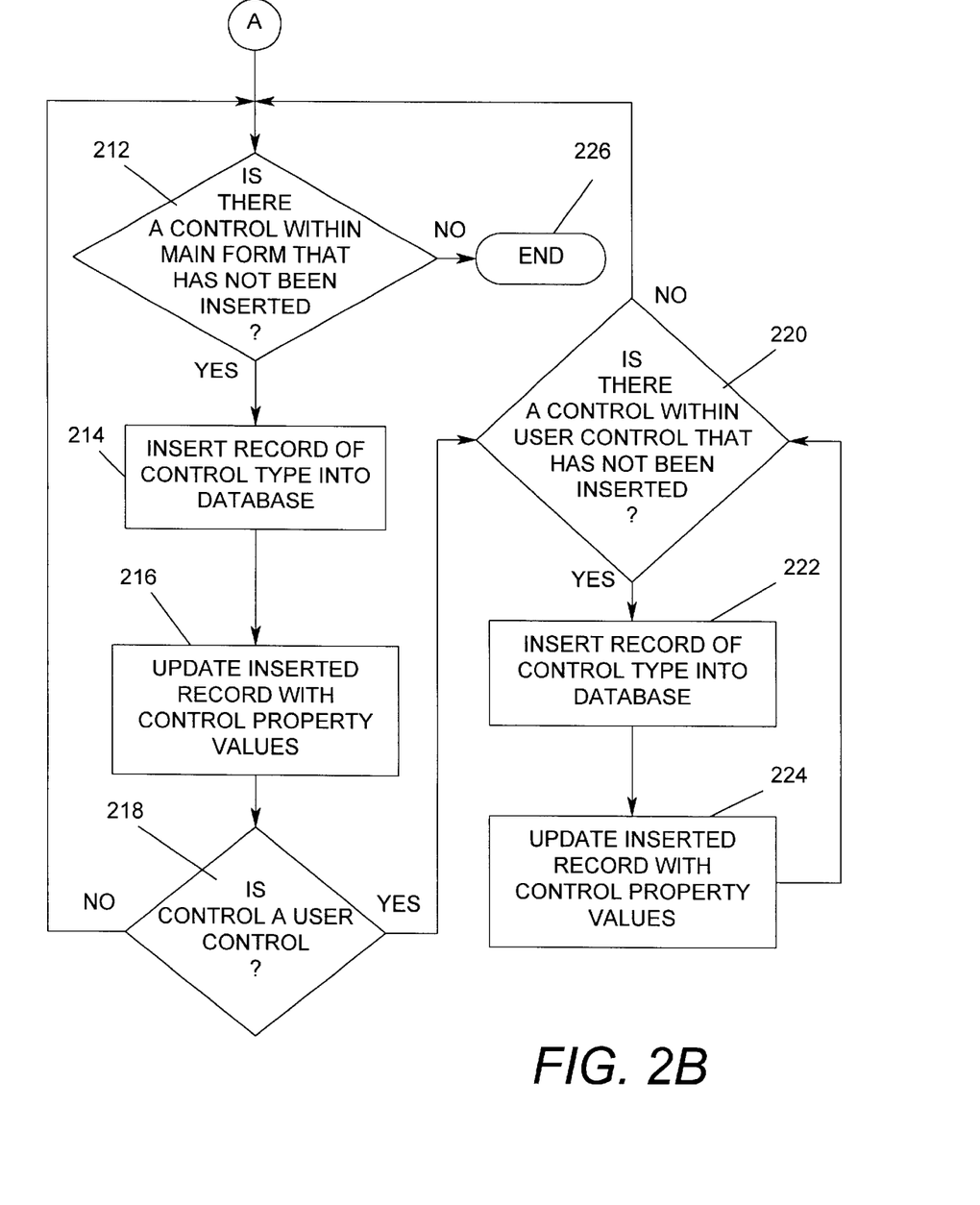
FIG. 2B is a flow diagram illustrating the saving of a screen dialog to a database in accordance with a preferred embodiment of the present invention.

Referring now to FIG. 2B, a block diagram flowchart is shown illustrating the procedure by which the CSU program stores the properties of the controls in the form into the database 104 in accordance with a preferred embodiment of the present invention. The CSU program will loop through all of the controls of the form and save the property values of the controls into the database 104. Initially in step 212, the CSU program will determine whether there is a control within the form which has not been saved to the database 104. If there is a control within the form which has not been saved, control of the CSU program moves to step 214 where a record of the control type is inserted into the database 104. The CSU program then updates the inserted record with the property values for that control in step 216.

It is next determined in step 218 whether the inserted control is a user control. A user control is a control including one or more additional controls. A determination that the control is not a user control causes the CSU program to return to step 212 to determine whether there are any other controls within the form which have not been saved. If the control is a user control, then the properties of additional controls within the user control must also be saved to the database 104. In step 220, a determination is made whether there is a control within the user control which has not yet been saved. If there is a control within the user control whose properties have not saved, the CSU program moves on to step 222 where a record of the control type is inserted into the database 104. The CSU program then updates the inserted record with the property values for that control in step 224. The CSU program the returns to step 220 to determine if any other controls within the user control whose property values have not been saved, and steps 222 and 224 are repeated for all of the additional controls within the user control.

Once all of the properties of the controls within a user control have been saved, the CSU program returns to step 212 to determine whether any further controls in the form have not been saved. Once it is determined that all of the controls within the form have had their properties saved into the database 104, the screen dialog save loop of the CSU program ends in step 226 and returns control to the user of the application requesting service of the CSU to save the state of a form referenced by the application. In this manner, the screen dialog save loop of the CSU program will loop through all of the controls of a form and save the property values of these controls in the database 104. This saves the state of the transient controls a user is currently viewing on the screen dialog, where the CSU program essentially takes a "snapshot" of the screen dialog and saves the current state of the screen dialog. This allows the same exact "snapshot" of the screen dialog to be restored for later reuse.

Figure 3A:
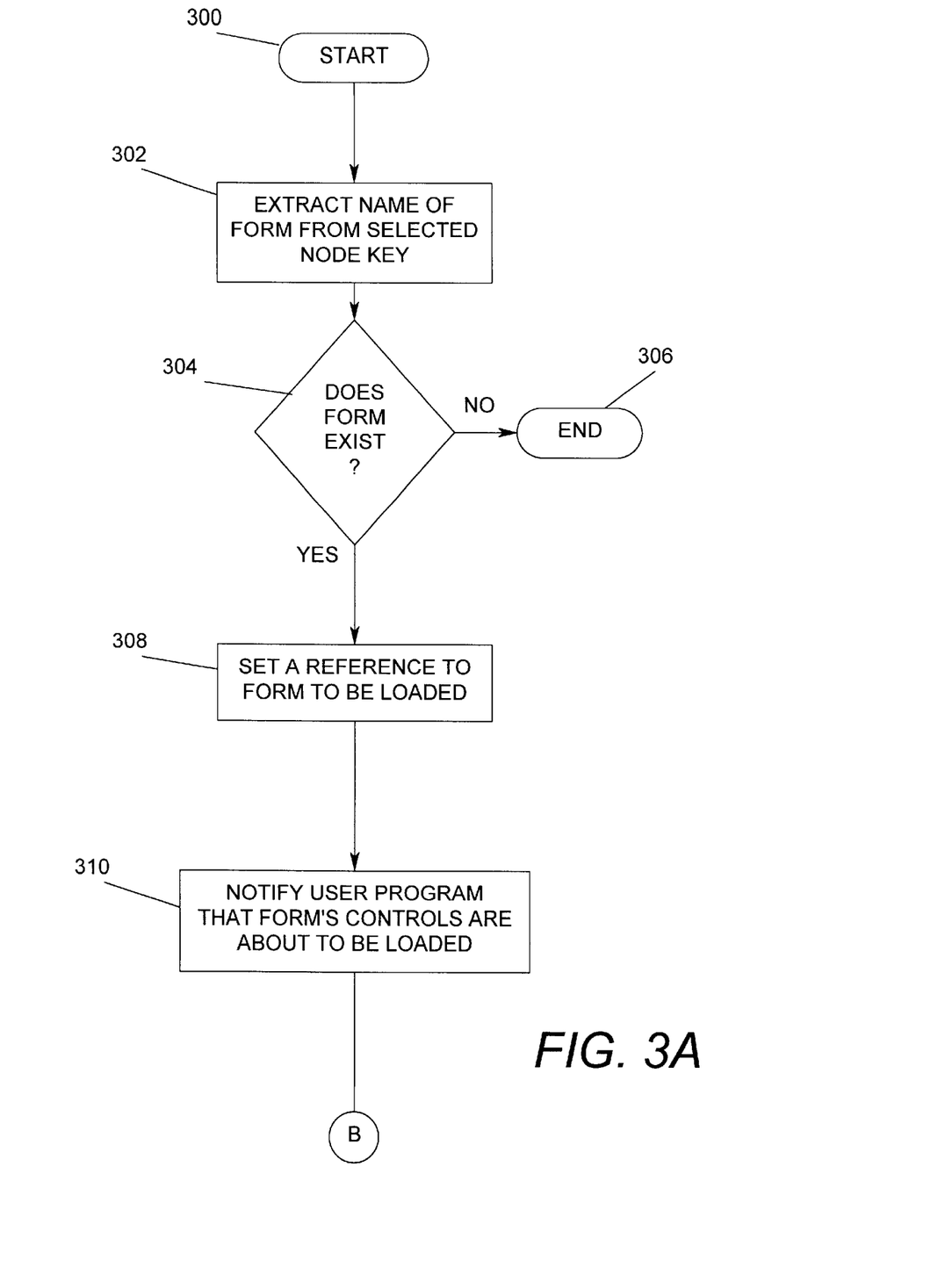
FIG. 3A is a flow diagram illustrating the operation of selecting a screen dialog to be restored in accordance with a preferred embodiment of the present invention.

When a user subsequently desires to restore a saved screen dialog, the user initiates a request to the computer system 100 and the CSU program is called upon and initially performs a command name retrieval process to select the saved screen dialog to be restored, as illustrated in a block diagram flowchart in FIG. 3A. The command name retrieval procedure begins at step 300 when a user initiates the screen dialog opening program of the present invention. Upon initiation of the open loop of the CSU program, the user is provided with an Open Dialog. The CSU program will display a list of saved command names to the user, along with any respective descriptions also saved for each command name. In step 302, the user selects a node identifying the command name to be restored, and the command name associated with the selected node is extracted. The CSU program then determines in step 304 whether a form associated with the extracted command name is indeed saved in the database 104. If there is not a saved form associated with the extracted command name, then the screen dialog opening loop of the CSU program ends in step 306 and control is returned to the user.

If the extracted command name coincides with a saved form, then the CSU program creates a reference to the form to be loaded and restored in step 308. In step 310, the CSU program then notifies the program currently operating on the computer system that the form's controls are about to be loaded. This allows the operating program to account for the loading of the form's controls as necessary.

Figure 3B:
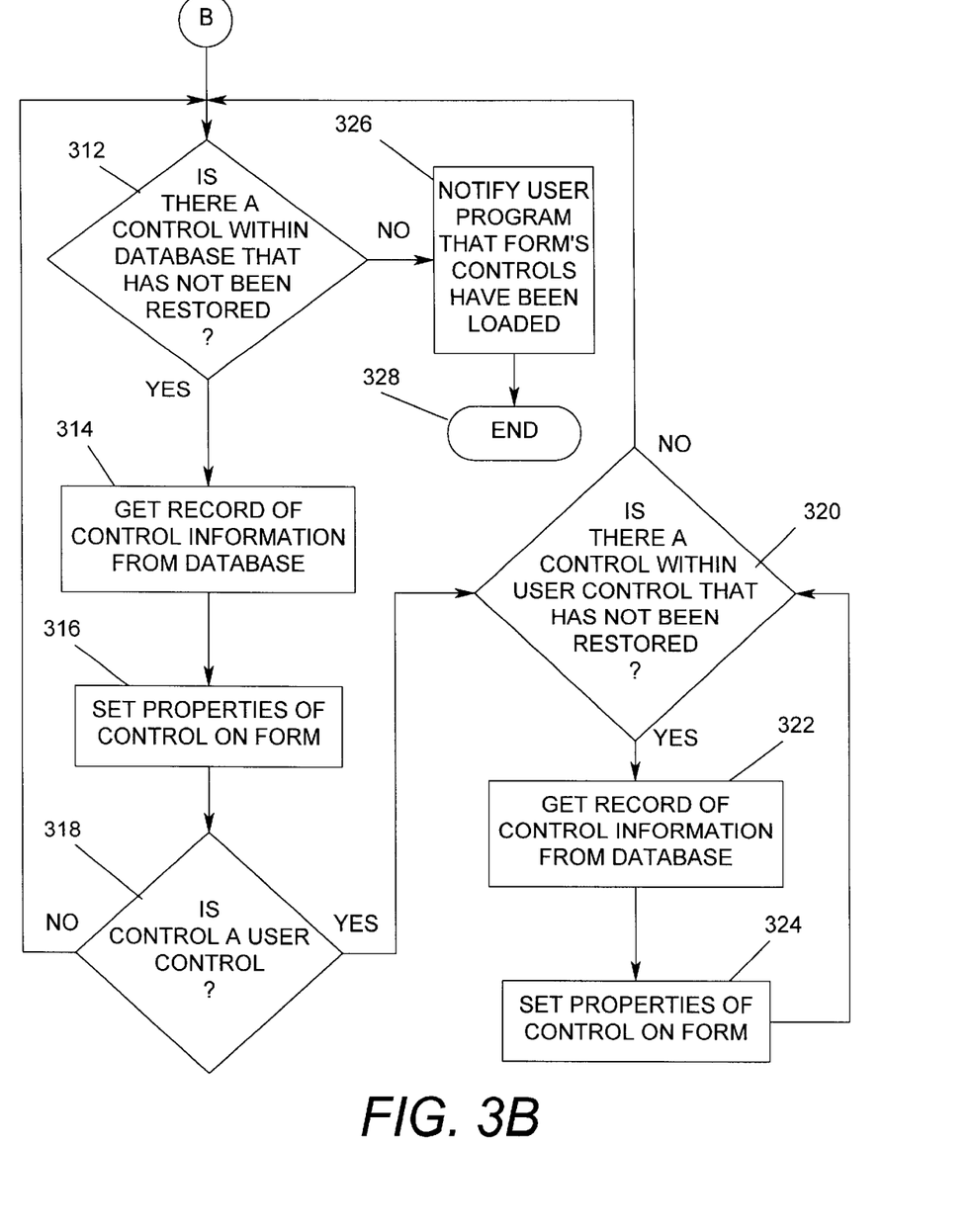
FIG. 3B is a flow diagram illustrating the restoring of a screen dialog from a database in accordance with a preferred embodiment of the present invention.

Referring now to FIG. 3B, a block diagram flowchart illustrates the procedure by which the CSU program restores the properties of the controls on the selected form from the database 104 in accordance with a preferred embodiment of the present invention. The CSU program will loop through all of the controls within the saved form and restore the property values of these controls. Initially in step 312, the CSU program determines whether there is a control within the saved form which has not been restored from the database 104. If there is a control within the form which has not restored, the CSU program obtains a record of the control information from the database 104 in step 314. The CSU program then sets the property values of the control on the restored form in step 316. It is next determined in step 318 whether the restored control is a user control consisting of one or more additional controls. A determination that the control is not a user control returns the CSU program to step 312 to determine whether there are any other controls within the saved form whose property values have not been restored.

If the control is a user control, then a determination is made in step 320 whether there is a control within the user control which has not been restored. If there is a control within the user control which has not restored, the CSU program obtains a record of the control information from the database 104 in step 322. The CSU program then sets the property values for that control on the restored form in step 324. The CSU program then returns to step 320 to determine if any other controls within the user control have not been restored, and steps 322 and 324 are repeated for all of the other controls within the user control. Once the property values for all the controls within a user control have been restored, the CSU program returns to step 312 to determine whether any further controls in the form have not been restored. Once it is determined that all of the controls within the form have been restored, the CSU program then notifies the user program that all of the form's transient controls have been loaded in step 326. The open dialog loop of the CSU program then ends and control is returned to the user in step 328. In this manner, the open dialog loop of the CSU program will loop through all of the controls of a form and restore the property values of all of the controls saved in the database 104 along with a respective form. This allows the exact state of the screen dialog when saved to be restored for the user.

As can be seen, the present invention provides an improved method for dynamically saving and restoring the properties of transient controls in a screen dialog without the need for a script and interpreter. The CSU program of the present invention avoids the use of a script and interpreter by saving the properties of transient controls within a screen dialog to a database. This same screen dialog environment can simply be restored by loading the dialog and restoring the control properties from information stored in the database.

The CSU "Save Command" dialog and "Open" dialog can be better understood by the following specific examples. It is understood that the following examples of saving a screen dialog and restoring a screen dialog are merely described for the purpose of illustrating a manner in which the present invention is implemented. These examples are not intended to and do not encompass all possible manners in the present invention may be used to save and restore the properties of transient controls in a screen dialog.

CSU Save Command Dialog Example

Figure 4:
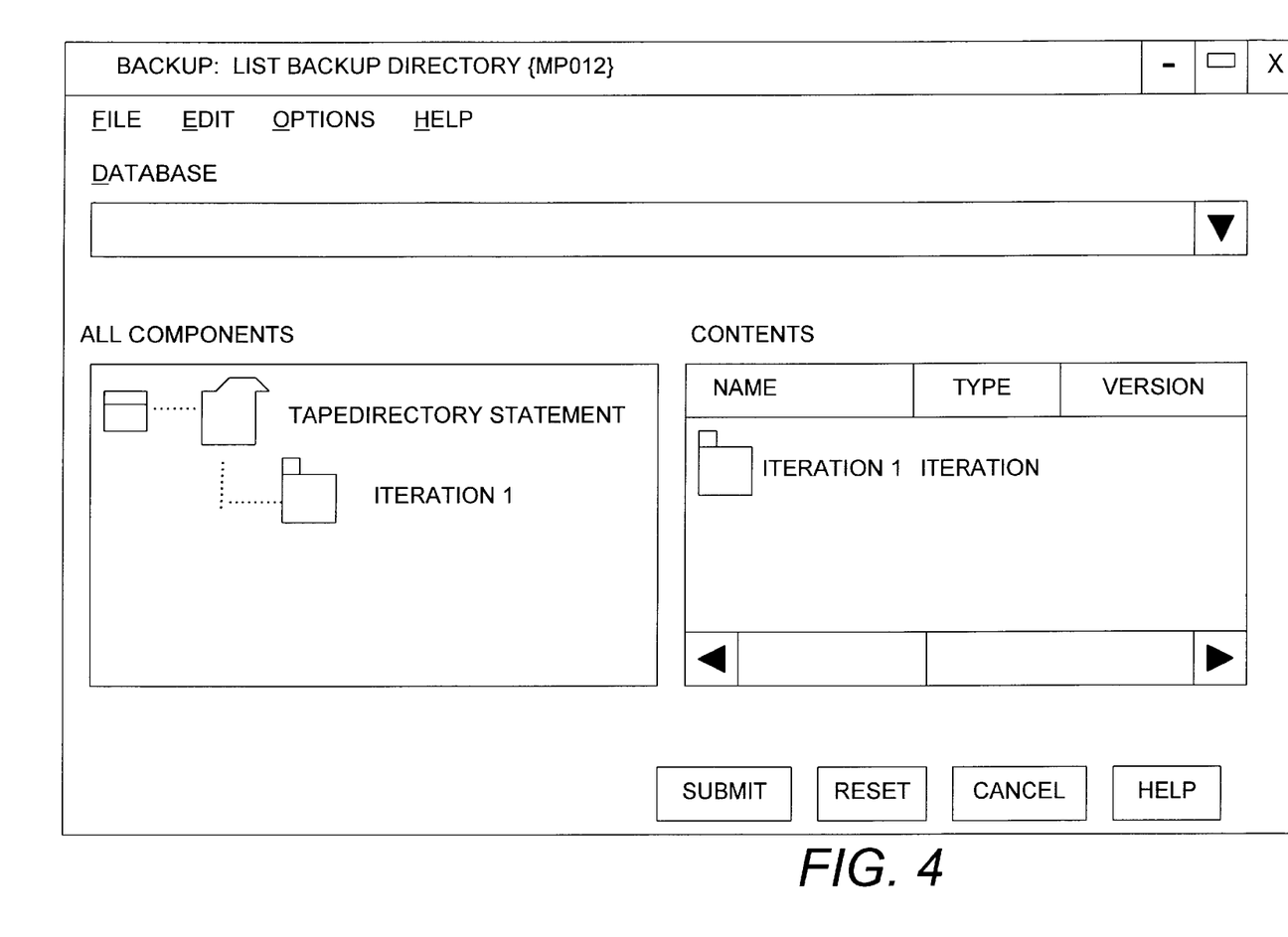
FIG. 4 is an illustration of an exemplary display screen of a blank form for reference in explaining the present invention.
Figure 5A:
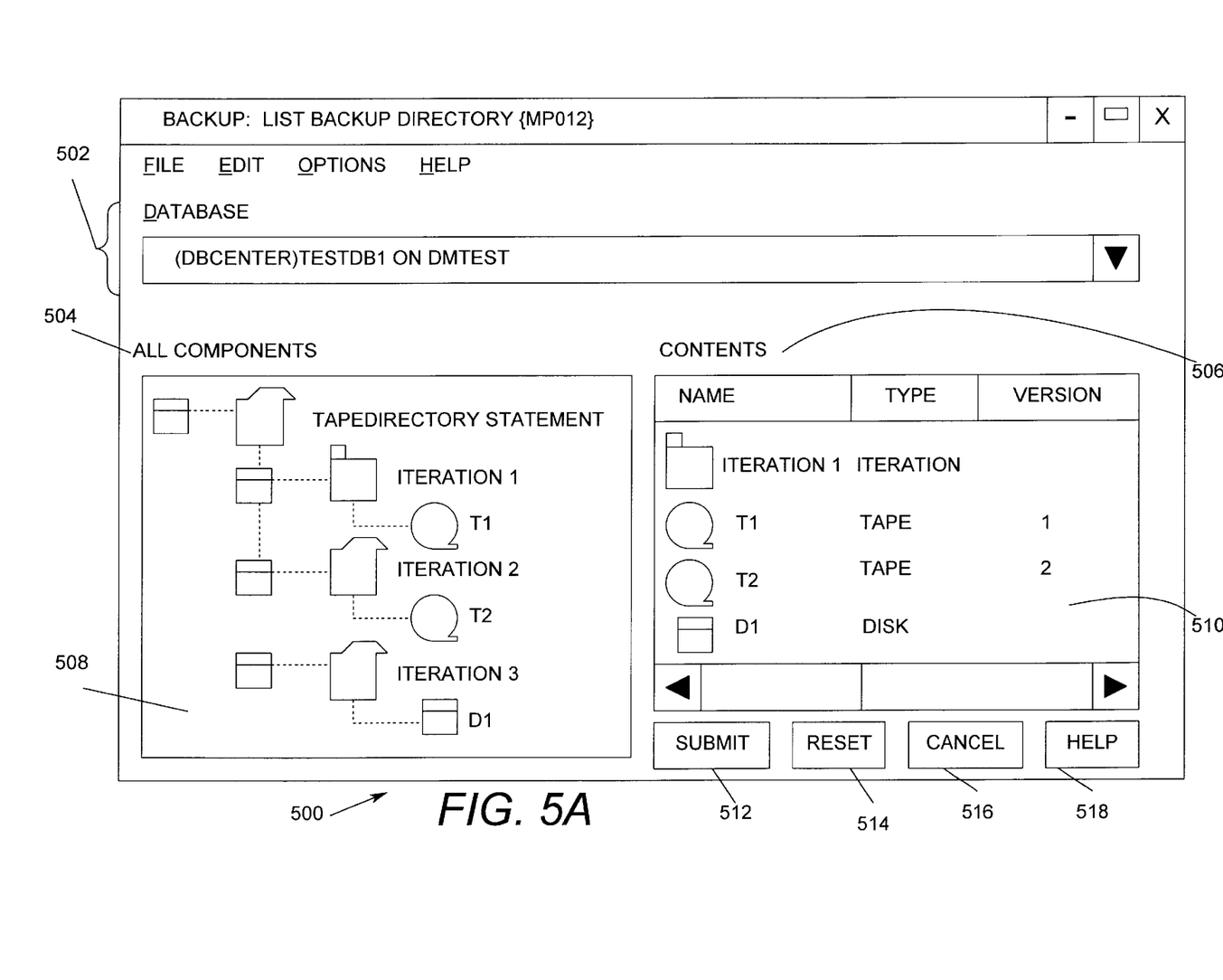
FIGS. 5A and 5B are illustrations of exemplary screen dialogs for reference in explaining the present invention.
Figure 5B:
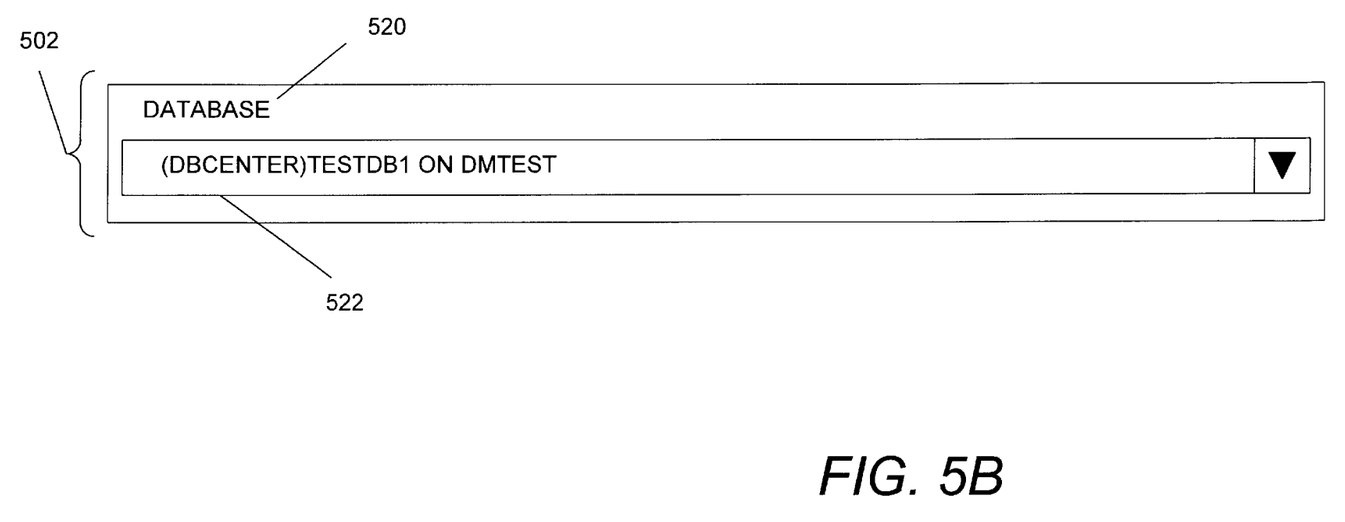

Operation of the CSU "Save Command" dialog can be better understood by the following example. FIG. 4 illustrates an exemplary blank form of an ActiveX screen dialog entitled "Backup: List Backup Directory [MP012]." This form is shown as a Visual Basic form but may comprise other similar forms. The interaction of the user with the controls on the form will create a screen dialog, where a screen shot 500 of the ActiveX screen dialog is illustrated in FIG. 5A. The screen dialog 500 consists of a user control 502, labels 504 and 506, a tree view 508, a list view 510, and command buttons 512, 514, 516, and 518. User control 502 is further comprised of a label 520 and a combo box 522, as shown in FIG. 5B.

Figure 6:
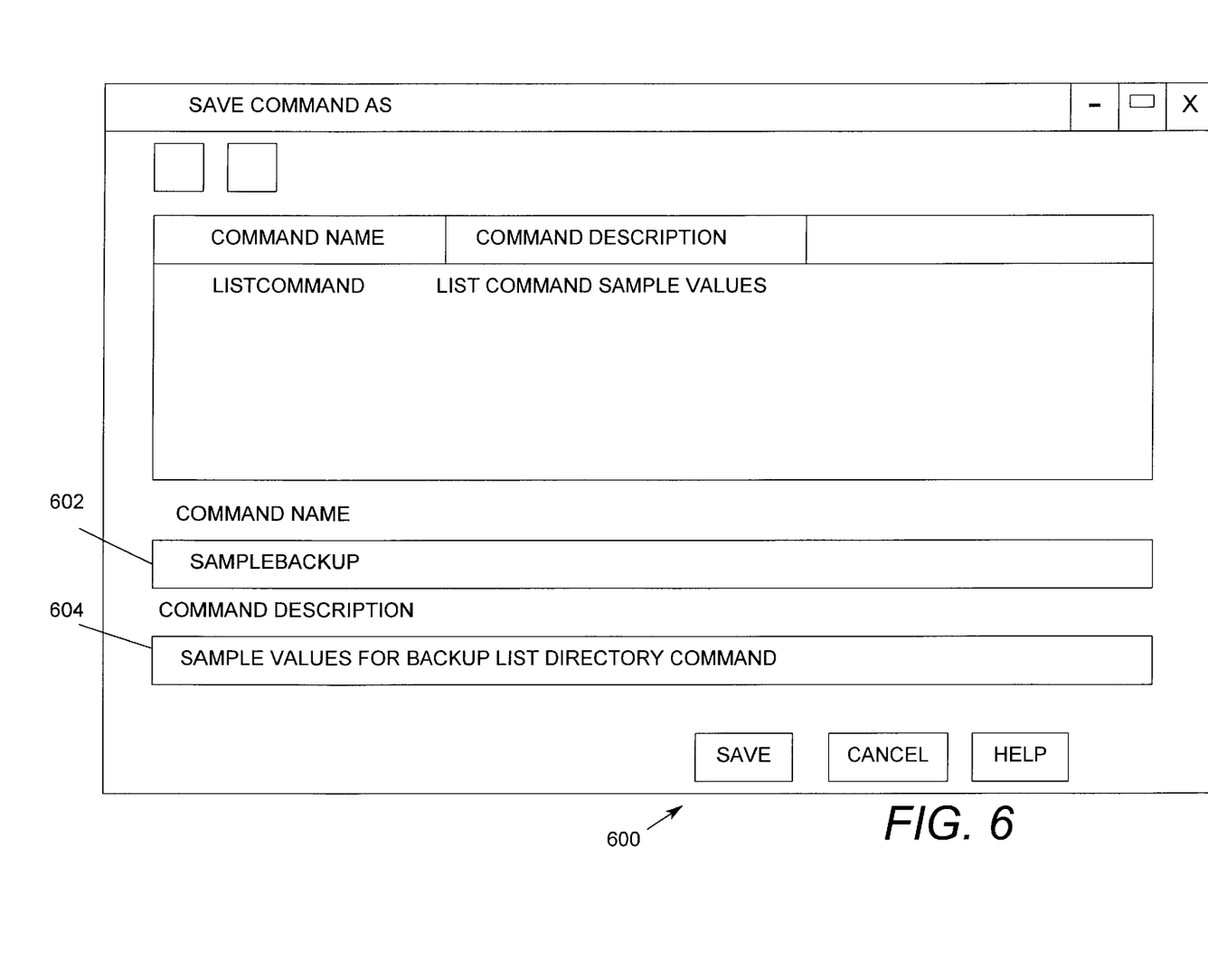
FIGS. 6 and 7 are illustrations of exemplary screen dialogs for reference in explaining the present invention.

When the user desires to save the properties of the controls in the screen dialog 500, the user selects "Save" from the File menu and the "Save Command As" dialog 600 appears to the user, as shown in FIG. 6. With reference back to the database verification procedure of FIG. 2A, the user is prompted for a command name 602 and optional command description 604 (step 202). As an example, the user enters values of 'SampleBackUp' for command name 602 and 'Sample values for BackUp List Directory command' for description 604. A determination is made whether the command name 602 is valid (step 204). Because 'SampleBackUp,' the value of 602, is not blank and does not contain invalid characters, the input command name 602 is found to be valid. The CSU program then considers whether the command name 602 is new (step 206). In this example, the command name 'SampleBackUp' does not exist within the CSU database. Therefore, the command name 602 is new. The CSU program then inserts a record of the entered command type into the database (step 208).

When saving the property values of the controls of the screen dialog 500 in FIG. 5A, the CSU program will loop through the controls of the screen dialog 500 and save all of the property values to the database. For the purposes of this example, it is assumed that the control properties discussed below represent all of the properties for that control. With reference back to the CSU save loop shown in FIG. 2B, a decision is made whether a control exists within the form 500 that has not been saved to the database (step 212). So far, no controls have been written to the database, so a record of a user control type is inserted for user control 502 (step 214). The CSU program then updates the inserted record with the control property values for user control 502 (step 216). Next, it is determined whether user control 502 is a user control (step 218). Here, user control 502 is a user control, consisting of label 520 and combo box 522.

The program will insert a record for each control within user control 502, starting with label 520 (step 220). First, the program inserts a record of a label type for label 520 into the database (step 222). The properties of caption='Database,' enabled=true, and visible=true are then updated in the database (step 224). The CSU program returns to step 220 and considers whether any controls within user control 502 have not been inserted into the database. Combo box 522 has not been inserted. The CSU program then inserts a record for combo box 522 (step 222), and stores the properties listcount=1, listindex=1, enabled=true, and text=' (DBCENTER)TESTDB1 ON DMTEST' in the database (step 224). The program revisits step 220 and determines that all controls within user control 502 have been inserted into the database.

After saving user control 502 to the database, the CSU program considers whether another control exists within the form 500 whose properties have not been saved (step 212). Label 504 has not been saved. Therefore, a record of a label 504 is inserted (step 214). The properties of caption='All Components,' enabled=true, and visible=true are saved to the database (step 216). It is determined that label 504 is not a user control (step 218), and the program returns to step 212. The CSU program again checks to see if a control exists that has not been inserted. Label 506 has not been inserted. The program inserts a record of a label 506 (step 214), and stores the properties caption='Contents,' enabled=true, and visible=true (step 216). Label 506 is then determined not to be a user control (step 218).

After saving label 506, the CSU program discovers that the properties of treeview 508 have not been saved to the database (step 212). The program inserts a record of treeview 508 into the database (step 214). Then, the treeview 508 properties of appearance=1-cc3D, BorderStyle=1-ccFixedSingle, checkboxes=false, nodes.count=7, sorted=false, style=7-tvwTreelinesPlusMinusPictureText, tag=4150, and visible=true are stored to the database (step 216). Because treeview 508 contains information for each node within the tree, the program also stores the properties of:

nodes(1)—
   parentIndex=−1, text='Tapedirectory Statement,' key='1Tapedirectory Statement,' index=1, nodes(2)—
   parentIndex=1, text='Iteration 1,' key='1Iteration,' index=2, nodes(3)—
   parentIndex=1, text='Iteration 2,' key='2Iteration,' index=3, nodes(4)—
   parentIndex=1, text='Iteration 3,' key='3Iteration,' index=4, nodes(5)—
   parentIndex=2, text='T1,' key='1Tape,' index=5, nodes(6)—
   parentIndex=3, text='T2,' key='2Tape,' index=6, nodes(7)—
   parentIndex=4, text='D1,' key='3Disk,' index=7.

The CSU program then determines that treeview 508 is not a user control (218).

After saving treeview 508, a decision is made whether there is a control within the form 500 that has not had its properties saved to the database (step 212). List view 510 has not been saved. A record of a listview type for 510 is inserted into the database (step 214), and the properties of sorted=false, sort key=0, tag='', visible=true, columnHeaders.count=3, and listItems.count=4 are updated in the database (step 216). Because specific information is associated with each column, the program also stores the properties of:

ColumnHeaders(1)—
   Text='Name,' Position=1,

ColumnHeaders(2)—
   Text='Type,' Position=2,

ColumnHeaders(3)—
   Text='Version,' Position=3.

Because listview 510 contains information for each item within the list, the program also stores the properties of:

ListItems(1)—
  Key='1Iteration,' Text='Iteration 1,' SubItems(01)='Iteration,' SubItems(02)=0,
ListItems(2)—
  Key='1Tape,' Text='T1,' SubItems(01)='Tape,' SubItems(02)=1,
ListItems(3)—
  Key='2Tape,' Text='T2,' SubItems(01)='Tape,' SubItems(02)=2,
ListItems(4)—
  Key='3Disk,' Text='D1,' SubItems(01)='Disk,' SubItems(02)=0.

The CSU program next determines that listview 510 is not a user control (step 218).

After saving listview 510 to the database, the CSU program again considers whether there is a control that has not had its properties inserted into the database (step 212). Command button 512 has not been inserted. Therefore, the program inserts a record of a command button type for command button 512 (step 214). The properties of caption='Submit,' enabled=true, and visible=true, are then saved to the database (step 216). Command button 512 is then determined not to be a user control (step 218).

Next, the CSU program determines that the properties for command button 514 have not been inserted into the database (step 212). A record of a command button type is inserted for 514 (step 214), and the properties of caption='Reset,' enabled=true, and visible='true,' are written to the database (step 216). Decision block 218 then considers whether command button 514 is a user control, which it is not.

After saving command button 514 to the database, command button 516 is found to have not had its properties inserted into the database (step 212). The program inserts a record of a command button type for command button 516 (step 214). The properties of caption='Cancel,' enabled=true, and visible=true, are saved to the database (step 216). Command button 516 is then found not to be a user control (step 218).

The CSU program then determines that the properties of command button 518 have not been inserted into the database (step 212). A record of a command button type is inserted for command button 518 (step 214), and the properties of caption='Help,' enabled=true, and visible='true,' are written to the database (step 216). Command button 518 is then determined not to be a user control (step 218).

The program returns to decision block 212, and considers the question of whether there is a control within the form 500 that has not had its properties inserted. At this point, all controls within the form 500 have had their properties saved to the database. Therefore, the save loop of the CSU program ends and control is returned to the user (step 226).

CSU Open Dialog Example

Figure 7:
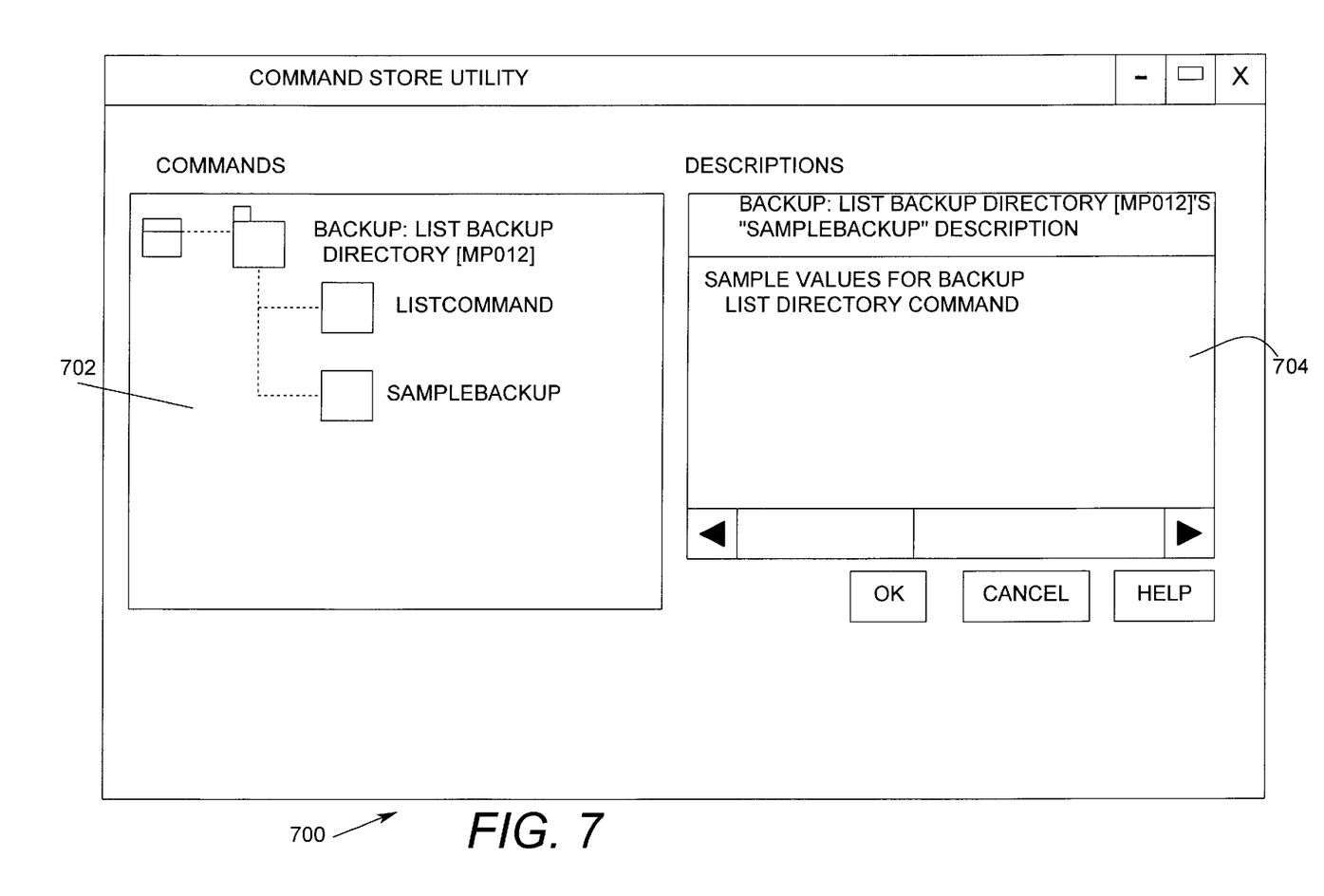

The CSU Open dialog can be better understood by the following example. Referring now to FIG. 7, a screenshot 700 is shown of an ActiveX screen dialog which will appear to a user when the user chooses to restore the properties of an ActiveX Dialog. When the user initiates a request to restore a screen dialog, the "Command Store Utility" Open dialog 700 appears to the user. The "Command Store Utility" dialog 700 will display a treeview 702 of saved command names, along with a description 704 for each command. In this example, 'SampleBackUp' is the selected command name in treeview 702 with its respective description appearing in description 704.

With reference back to FIG. 3A, the CSU program extracts the text 'SampleBackUp' from the selected command name in treeview 702 (step 302). Decision block 304 considers whether a form associated with the extracted command name exists, where it will be assumed for the purposes of this example that this form exists. The CSU program then creates a reference to the 'SampleBackUp' form (step 308) and sends notification to the user program that the form's controls are about to be loaded (step 310). As shown in FIGS. 5A and 5B, the screen dialog 500 for the saved form 'SampleBackUp' consists of a user control 502, labels 504 and 506, a tree view 508, a list view 510, and command buttons 512, 514, 516, and 518. User control 502 further including label 520 and combo box 522.

When restoring the properties of the 'SampleBackUp' form, the CSU program will loop through the controls saved within the database as illustrated by the steps in FIG. 3B. For purposes of this example, we will assume the control properties discussed below represent all of the properties saved to the database. Initially, a decision is made whether a control exists within the 'SampleBackUp' form saved in the database that has not been restored (step 312). So far, no controls have been restored to the 'SampleBackUp' form. A record of control information is retrieved from the database for user control 502 (step 314). The CSU program then sets the properties of user control 502 on the form (step 316). Next, it is determined whether user control 502 is a user control. In this instance, user control 502 is a user control consisting of label 504 and combo box 506.

The CSU program will retrieve a record for each control within the database for user control 502, starting with label 520 (step 320). The CSU program first retrieves a record of control information for label 520 (step 322). The properties of caption='Database,' enabled=true, and visible=true are then set on the form (step 324). The CSU program returns to step 320 and considers whether any other controls within the user control 502 have not been restored. Combo box 522 has not been restored. The CSU program then retrieves the control information for combo box 522 (step 322), and sets the properties listcount=1, listindex=1, enabled=true, and text='(DBCENTER)TESTDB1 ON DMTEST' on the form (step 324). The program revisits decision block 320 and determines all controls within the database have been set for user control 502.

After setting the property values for user control 502, the CSU program considers whether another control in form 500 exists within the database that has not been restored (step 312). Label 504 has not been restored. Therefore, a record of control information for label 504 is retrieved (step 314). The properties of caption='All Components,' enabled=true, and visible=true are set on the form (step 316). A determination is then made that label 504 is not a user control. Next, the CSU program determines that label 506 has not been restored to form 500 (step 312). The CSU program retrieves control information for label 506 (step 314), and sets the properties caption='Contents,' enabled=true, and visible=true on the form. A determination then made that label 506 is not a user control (step 318).

After setting the property values for label 506, the CSU program discovers that treeview 508 has not been restored (step 312). The program obtains a record of control information from the database for treeview 508 (step 314). Then, the treeview properties of appearance=1-cc3D, BorderStyle=1-cc FixedSingle, checkboxes=false, nodes.count=7, sorted=false, style=7-tvwTreelinesPlusMinusPictureText, tag=4150, and visible=true are set on the form (step 316). Because the treeview 508 contains information for each node within the tree, the program also sets the properties of:

nodes(1)—
        parentIndex=−1, text='Tapedirectory Statement,' key='1Tapedirectory Statement,' index=1,
    nodes(2)—
        parentIndex=1, text='Iteration 1,' key='1Iteration,' index=2,
    nodes(3)—
        parentIndex=1, text='Iteration 2,' key='2Iteration,' index=3,
    nodes(4)—
        parentIndex=1, text='Iteration 3,' key='3Iteration,' index=4,
    nodes(5)—
        parentIndex=2, text='T1,' key='1Tape,' index=5,
    nodes(6)—
        parentIndex=3, text='T2,' key='2Tape,' index=6,
    nodes(7)—
        parentIndex=4, text='D1,' key='3Disk,' index=7.

The CSU program then determines that treeview 508 is not a user control (step 318).

After restoring treeview 508, it is determined that listview 510 has not been restored to the form 500 (step 312). A record of control information for listview A5 is retrieved from the database (step 314), and the properties of sorted=false, sort key=0, tag=", visible=true, columnHeaders.count=3, and listItems.count=4 are updated on the form (step 316). Because specific information is associated with each column, the program also updates the properties of:

ColumnHeaders(1)—
        Text='Name,' Position=1,
    ColumnHeaders(2)—
        Text='Type,' Position=2,
    ColumnHeaders(3)—
        Text='Version,' Position=3.

Because a listview contains information for each item within the list, the program also sets the properties of:

ListItems(1)—
        Key='1Iteration,' Text='Iteration 1,' SubItems(01)='Iteration,' SubItems(02)=0,
    ListItems(2)—
        Key='1Tape,' Text='T1,' SubItems(01)='Tape,' SubItems(02)=1,
    ListItems(3)—
        Key='2Tape,' Text='T2,' SubItems(01)='Tape,' SubItems(02)=2,
    ListItems(4)—
        Key='3Disk,' Text='D1,' SubItems(01)='Disk,' SubItems(02)=0.

The CSU program then determines that listview 510 is not a user control (step 318) and returns control to step 312.

The CSU program again considers whether there is a control that has not been restored from the database (step 312). Command button 512 has not been restored. Therefore, the program retrieves control information for command button 512 (step 314). The properties of caption='Submit,' enabled=true, and visible=true, are set on the form 500 (step 316). Command button 512 is then determined not to be a user control (step 318). Next, the program determines that command button 514 has not been restored from the database (step 312). A record of control information for command button 514 is retrieved (step 314), and the properties of caption='Reset,' enabled=true, and visible='true,' are set on the form 500 (step 316). Decision step 318 then determines that command button 514 is not a user control.

After restoring command button 514, command button 516 is found to have not been restored (step 312). The program retrieves control information for command button 516 (step 314). The properties of caption='Cancel,' enabled=true, and visible=true, are restored to the form 500 (step 316). Command button 516 is determined not to be a user control (step 318). Returning to step 312, the CSU program determines that command button 518 has not been restored to the form. A record of control information for command button 518 is retrieved (step 314), and the properties of caption='Help,' enabled=true, and visible='true,' are set on the form 500 (step 316). Decision step 318 then determines that command button 518 is not a user control (step 318).

The CSU program returns to decision step 312, and considers the question of whether there is a control within the database that has not been restored. At this point, all controls saved within the database have been restored to the form 500. Therefore, the CSU program notifies the user program that all controls have been loaded for the 'SampleBackUp' form (step 326). Finally, the open loop of the CSU program ends and control returns to the user (step 328).

While it is understood that the present invention can be utilized with any ActiveX compatible computer software programming language, one possible use of the Command Store Utility (CSU) is its integration into the Unisys Clearpath product NX/DBCenter. NX/DBCenter is a client/server application that generates utility requests and submits those requests from a Windows® based workstation to a ClearPath MCP NX Server. The CSU is a stand-alone ActiveX control (OCX) that persists the state of a form's transient controls for later reuse. The NX/DBCenter CSU avoids the use of a script and interpreter by using the CSU to save and retrieve functional requests as command by the user.

The CSU feature of NX/DBCenter provides a facility for users to save and restore utility requests. The CSU stores all request information in an Access database or other similar database, where the user defines the location of the saved information as well as the name of the stored request. The CSU provides a user interface that allows users to manipulate saved requests. When called from the main dialog in NX/DBCenter, the CSU interface allows user to select and load any saved request. When called from a functional dialog in NX/DBCenter (selected from the main menu), the CSU interface allows users to either save the properties of controls in a current functional screen dialog or select and load only those requests saved for that functional screen dialog. A user can then browse and access multiple CSU databases, thus providing the ability to share CSU databases.

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Those skilled in the art will appreciate that various adaptations and modifications of the just-described preferred embodiments can be configured without departing from the scope and spirit of the invention. Therefore, it is to be understood that within the scope of the appended claims, the invention may be practiced other than as specifically described herein.

One of the many possible pseudocode listings which could be implemented to practice the disclosed procedure is presented below.

Database Verification
Connect to MDB file database (created through ADOX)
If database file (CSU.MDB) does not exist in CSU folder
   Create the database file based on defined Schema
Else {if database file already exists}
   If Schema is not valid at the Table Level
     Destroy Existing Schema and create new Schema
Save Command
While command name exists and user does not want to overwrite
   Display SaveAs Dialog, prompting for command name/description
If command name is new
   Insert record of command type into database
Else {command name already exists}
   Update description for command type in database
   Replace command ID
For each control in the form
   Insert record of control type into database
   Update inserted record with control property values
   If the control is a user control
     Repeat lines 17–21 for user control form
Load Command
With node key selected from list of forms in treeview
   Extract the name of the form to be loaded
   Set a reference to the form to be loaded
   If form does not exist—ERROR
Notify user program that the command form's controls are about to be set
For each control in the database
   Get record of control information from database
   Set the properties of the control on the form
   If the control is a user control
     Repeat lines 29–33 for user control form
Notify user program that the control setting is complete

What is claimed is:

1. A method for saving and restoring the property values of control objects in a computer program screen dialog, said saving comprising:
   receiving a request to save the contents of a screen dialog;
   determining which objects appearing in the screen dialog are controls to be saved by the request, each control possessing associated property values; and
   saving each object determined to be a control in the screen dialog along with its respective property values to a database;
   said restoring comprising:
   receiving a request containing a command name for a screen dialog to be restored;
   determining whether a screen dialog associated with the command name appearing in the request is stored in the database; and
   restoring each object which is a control in the saved screen dialog along with its respective property values without the use of a script.

2. The method of claim 1 wherein the steps of determining which objects are controls and saving these controls in the database include the following steps:
   (1) determining if there is a control in the screen dialog which has not yet been saved in the database;
   (2) inserting a record for the control which has not been saved into the database; and
   (3) updating the inserted record with the respective property values for the control
   wherein steps (1)–(3) are repeated for all of the controls contained in the screen dialog.

3. The method of claim 2 further comprising the step of determining whether a control is a user control including at least one additional control.

4. The method of claim 3 further comprising the following steps when a user control is detected:
   determining if there is a control within the user control which has not been saved in the database;
   inserting a record for the control within the user control which has not been saved into the database; and
   updating the inserted record with the respective property values for the control within the user control;
   wherein the above steps are repeated until all of the controls within a user control have been saved in the database.

5. The method of claim 1, further comprising the step of initially prompting the user to input a command name for the screen dialog to be saved.

6. The method of claim 5 wherein a database verification procedure is initially performed to determine whether a screen dialog associated with the input command name exists in the database.

7. The method of claim 1 wherein the screen dialog restoring step includes the following steps:
   (1) determining if there is a control within the requested screen dialog which has not yet been restored;
   (2) obtaining and restoring a record for a control which has not been restored from the database; and
   (3) setting the respective property values for the restored control;
   wherein the steps (1)–(3) are repeated until all of the controls in the requested screen dialog have been restored.

8. The method of claim 7 further comprising the steps of:
   determining whether a restored control is a user control including at least one additional control;
   determining if there is a control within the user control which has not yet been restored from the database;
   obtaining and restoring a record for the control within the user control; and
   setting the respective property values for the restored control within the user control;
   wherein the above steps are repeated until all of the controls within a user control have been restored.

9. A computer-readable medium having computer-executable instructions embodied thereon for performing a method for saving and restoring the property values of control objects in a screen dialog, said saving comprising:
    receiving a request to save the contents of a screen dialog;
    determining which objects appearing in the screen dialog are controls to be saved by the request, each control possessing associated property values; and
    saving each object determined to be a control in the screen dialog along with its respective property values to a database;
said restoring comprising:
    receiving a request containing a command name for a screen dialog to be restored;
    determining whether a screen dialog associated with the command name appearing in the request is stored in the database; and
    restoring each object which is a control in the saved screen dialog along with its respective property values without the use of a script.

10. The computer-readable medium of claim 9 wherein the computer-readable instructions for determining which objects are controls and saving these controls in the database further include the following steps:
    (1) determining if there is a control in the screen dialog which has not yet been saved in the database;
    (2) inserting a record for the control which has not been saved into the database; and
    (3) updating the inserted record with the respective property values for the control;
    wherein steps (1)–(3) are repeated for all of the controls contained in the screen dialog.

11. The computer-readable medium of claim 10 wherein the computer-readable instructions further comprise the step of determining whether a control is a user control including at least one additional control.

12. The computer-readable medium of claim 11 wherein the computer-readable instructions further comprise the following steps when a user control is detected:
    determining if there is a control within the user control which has not been saved in the database;
    inserting a record for the control within the user control which has not been saved into the database; and
    updating the inserted record with the respective property values for the control within the user control;
    wherein the above steps are repeated until all of the controls within a user control have been saved in the database.

13. The computer-readable medium of claim 9 wherein the computer-readable instructions further comprise the step of initially prompting the user to input a command name for the screen dialog to be saved.

14. The computer-readable medium of claim 13 wherein the computer-readable instructions further comprise a database verification procedure which is initially performed to determine whether a screen dialog associated with the input command name exists in the database.

15. The computer-readable medium of claim 9 wherein the computer-readable instructions for restoring each object includes the following steps:
    (1) determining if there is a control within the requested screen dialog which has not yet been restored;
    (2) obtaining and restoring a record for a control which has not been restored from the database; and
    (3) setting the respective property values for the restored control;
    wherein the steps (1)–(3) are repeated until all of the controls I the requested screen dialog have been restored.

16. The computer-readable medium of claim 15 wherein the computer-readable instructions further comprise the steps of:
    determining whether a restored control is a user control including at least one additional control;
    determining if there is a control within the user control which has not yet been restored from the database;
    obtaining and restoring a record for the control within the user control; and
    setting the respective property values for the restored control within the user control;
    wherein the above steps are repeated until all of the controls within a user control have been restored.

17. A system for saving and restoring the property values of control objects in a computer program screen dialog, comprising:
    means for saving the property values of control objects comprising:
        means for receiving a request to save the contents of a screen dialog;
        means for determining which objects appearing in the screen dialog are controls to be saved by the request, each control possessing associated property values; and
        means for saving each object determined to be a control in the screen dialog along with its respective property values to a database; and
    means for restoring the property values of control objects comprising:
        means for receiving a request containing a command name for a screen dialog to be restored;
        means for determining whether a screen dialog associated with the command name appearing in the request is stored in the database;
        means for restoring each object which is a control in the saved screen dialog along with its respective property values.

18. The system of claim 17 wherein the means for determining which objects are controls further:
    (1) determines if there is a control in the screen dialog which has not yet been saved in the database;
    wherein the means for saving each object then:
    (2) inserts a record for the control which has not been saved into the database; and
    (3) updates the inserted record with the respective property values for the control;
    wherein steps (1)–(3) are repeated for all of the controls contained in the screen dialog.

19. The system of claim 18 further comprising means for determining whether a control is a user control including at least one additional control.

20. The system of claim 19, wherein upon detection of a user control, the system further comprises:
    means for determining if there is a control within the user control which has not been saved in the database;
    means for inserting a record for the control within the user control which has not been saved into the database; and
    means for updating the inserted record with the respective property values for the control within the user control;
    wherein the steps performed by the above means are repeated until all of the controls within a user control have been saved in the database.

21. The system of claim 12 further comprising means for initially prompting the user to input a command name for the screen dialog to be saved.

22. The system of claim 21 further comprising means for performing a database verification procedure to determine whether a screen dialog associated with the input command name exists in the database.

23. The system of claim 12 wherein the means for restoring each object in the saved screen dialog further:
   (1) determines if there is a control within the requested screen dialog which has not yet been restored;
   (2) obtains and restores a record for a control which has not been restored from the database; and
   (3) sets the respective property values for the restored control;
   wherein the above steps (1)–(3) are repeated until all of the controls in the requested screen dialog have been restored.

24. The system of claim 23 further comprising:
   means for determining whether a restored control is a user control including at least one additional control;
   means for determining if there is a control within the user control which has not yet been restored from the database;
   means for obtaining and restoring a record for the control within the user control; and
   means for setting the respective property values for the restored control within the user control;
   wherein the above steps are repeated until all of the controls within a user control have been restored.

* * * * *